(12) United States Patent
Morton et al.

(10) Patent No.: US 12,467,384 B1
(45) Date of Patent: Nov. 11, 2025

(54) TRANSLATABLE GUIDE VANES FOR AIRCRAFT PROPULSION SYSTEM

(71) Applicant: RTX Corporation, Farmington, CT (US)

(72) Inventors: Jeffrey T Morton, Manchester, CT (US); Murat Yazici, Glastonbury, CT (US); Thomas E Clark, Wells, ME (US); Konstantinos P Giannakopoulos, Middletown, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/948,970

(22) Filed: Nov. 15, 2024

(51) Int. Cl.
| | | |
|---|---|---|
| *F01D 17/16* | (2006.01) | |
| *B64D 27/10* | (2006.01) | |
| *F01D 5/14* | (2006.01) | |
| *F04D 29/54* | (2006.01) | |

(52) U.S. Cl.
CPC ........... *F01D 17/162* (2013.01); *B64D 27/10* (2013.01); *F01D 5/141* (2013.01); *F01D 5/148* (2013.01); *F04D 29/541* (2013.01); *F05D 2220/323* (2013.01)

(58) Field of Classification Search
CPC ........ F04D 29/541; F01D 5/141; F01D 5/148; F01D 17/162; F05D 2220/323
See application file for complete search history.

(56) References Cited

U.S. PATENT DOCUMENTS

| | | | | |
|---|---|---|---|---|
| 2,999,630 | A | * 9/1961 | Warren | .................. F04D 29/563 |
| | | | | 74/559 |
| 3,295,827 | A | * 1/1967 | Chapman | .............. F01D 17/162 |
| | | | | 415/161 |
| 4,652,208 | A | * 3/1987 | Tameo | .................. F01D 17/162 |
| | | | | 415/162 |
| 4,995,786 | A | 2/1991 | Wheeler | |
| 5,314,301 | A | * 5/1994 | Knight | .................. F01D 17/162 |
| | | | | 415/161 |

(Continued)

FOREIGN PATENT DOCUMENTS

| | | |
|---|---|---|
| DE | 10257044 B4 | 1/2005 |
| FR | 3082230 B1 | 8/2020 |

(Continued)

OTHER PUBLICATIONS

Gas Generator (Core Engine)—NPL 2021 (Year: 2021).*
Gas Turbines in Simple Cycle & Combined—Wayback Aug. 16, 2019 (Year: 2019).*

*Primary Examiner* — Brian Christopher Delrue
(74) *Attorney, Agent, or Firm* — Getz Balich LLC

(57) ABSTRACT

An assembly is provided for an aircraft propulsion system. This assembly includes an open propulsor rotor and an open guide vane structure. The open propulsor rotor is configured to rotate about a rotational axis. The open guide vane structure is axially next to the open propulsor rotor. The open guide vane structure includes a plurality of open guide vanes arranged circumferentially about the rotational axis. The open guide vanes include a first open guide vane. The first open guide vane includes a first vane leading edge, a first vane trailing edge and a fixed first vane chord length measured from the first vane leading edge to the first vane trailing edge. The first open guide vane is configured to translate axially along the rotational axis.

20 Claims, 6 Drawing Sheets

(56) References Cited

U.S. PATENT DOCUMENTS

| | | | |
|---|---|---|---|
| 5,778,659 A * | 7/1998 | Duesler | F02K 1/72 |
| | | | 244/110 B |
| 8,347,633 B2 * | 1/2013 | Smith | F01D 17/162 |
| | | | 60/771 |
| 9,835,044 B2 | 12/2017 | Lecordix | |
| 10,669,881 B2 | 6/2020 | Breeze-Stringfellow | |
| 10,934,883 B2 | 3/2021 | Dyer | |
| 10,995,633 B2 * | 5/2021 | Kusakabe | F01D 21/045 |
| 11,111,811 B2 | 9/2021 | Joly | |
| 11,585,354 B2 | 2/2023 | Miller | |
| 11,655,767 B2 * | 5/2023 | Hrubec | F02C 7/36 |
| | | | 415/122.1 |
| 11,655,778 B2 | 5/2023 | Joly | |
| 11,802,525 B2 * | 10/2023 | Chaudhari | F01D 17/162 |
| 11,879,343 B2 * | 1/2024 | Hall | F01D 17/162 |
| 12,203,385 B1 * | 1/2025 | Morton | F01D 5/147 |
| 12,241,377 B2 * | 3/2025 | Lima | F04D 29/563 |
| 12,292,056 B2 * | 5/2025 | Heeter | F01D 17/162 |
| 2009/0097967 A1 * | 4/2009 | Smith | F04D 29/563 |
| | | | 415/1 |
| 2012/0124964 A1 * | 5/2012 | Hasel | F04D 29/563 |
| | | | 60/226.3 |
| 2017/0102006 A1 * | 4/2017 | Miller | F04D 29/563 |
| 2018/0058260 A1 * | 3/2018 | Cottet | F01D 25/18 |
| 2020/0191004 A1 * | 6/2020 | Prasad | F01D 17/16 |

FOREIGN PATENT DOCUMENTS

| | | | |
|---|---|---|---|
| FR | 3118094 A1 | 6/2022 | |
| JP | 04061635 B2 | 6/2003 | |
| WO | 2021205127 A1 | 10/2021 | |

* cited by examiner

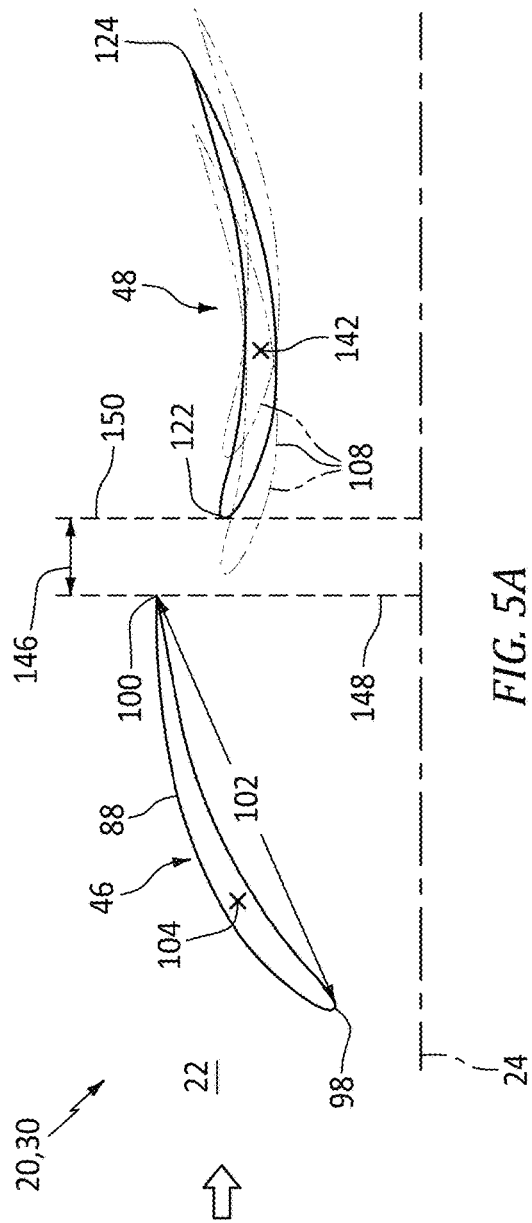
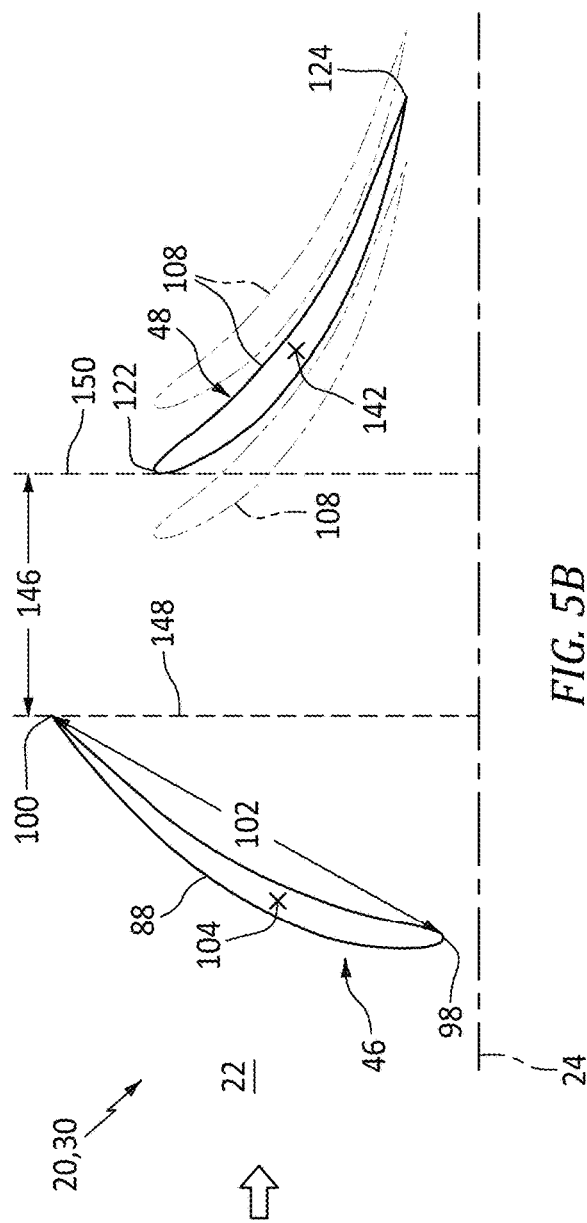

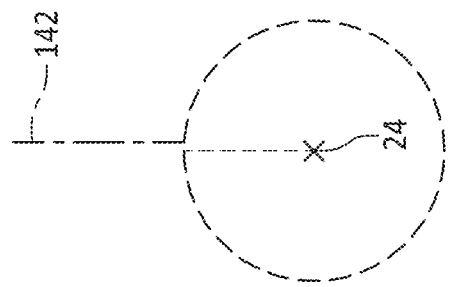
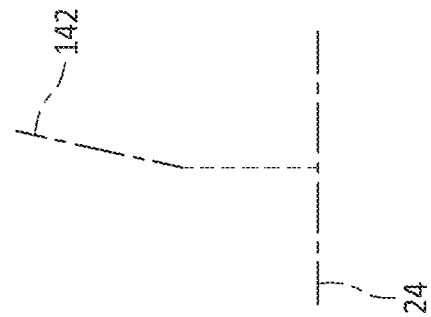
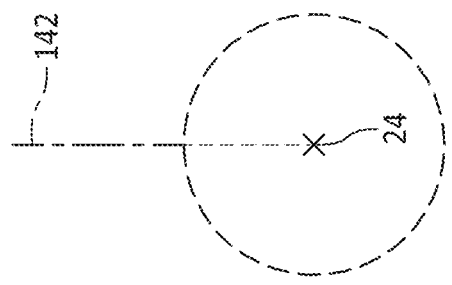
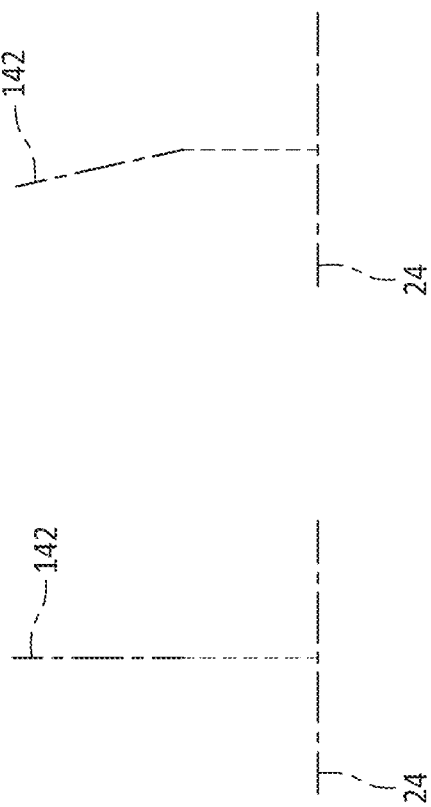

TRANSLATABLE GUIDE VANES FOR AIRCRAFT PROPULSION SYSTEM

BACKGROUND OF THE DISCLOSURE

1. Technical Field

This disclosure relates generally to an aircraft and, more particularly, to a guide vane structure for an aircraft propulsion system.

2. Background Information

An aircraft propulsion system may include a guide vane structure arranged downstream of a propulsor rotor to condition air propelled by the propulsor rotor. Various types and configurations of guide vane structures are known in the art. While these known guide vane structures have various benefits, there is still room in the art for improvement.

SUMMARY OF THE DISCLOSURE

According to an aspect of the present disclosure, an assembly is provided for an aircraft propulsion system. This assembly includes an open propulsor rotor and an open guide vane structure. The open propulsor rotor is configured to rotate about a rotational axis. The open guide vane structure is axially next to the open propulsor rotor. The open guide vane structure includes a plurality of open guide vanes arranged circumferentially about the rotational axis. The open guide vanes include a first open guide vane. The first open guide vane includes a first vane leading edge, a first vane trailing edge and a fixed first vane chord length measured from the first vane leading edge to the first vane trailing edge. The first open guide vane is configured to translate axially along the rotational axis.

According to another aspect of the present disclosure, another assembly is provided for an aircraft propulsion system. This assembly includes a propulsor rotor, a guide vane structure and a vane actuation system. The propulsor rotor is configured to rotate about a rotational axis. The guide vane structure is axially next to the propulsor rotor. The guide vane structure includes a plurality of guide vanes arranged circumferentially about the rotational axis. The guide vanes include a first guide vane. The vane actuation system is configured to pivot the first guide vane about a first vane pivot axis. The vane actuation system is configured to translate the first vane pivot axis axially along the rotational axis.

According to still another aspect of the present disclosure, another assembly is provided for an aircraft propulsion system. This assembly includes an open propulsor rotor, an open guide vane structure and a vane actuation system. The open propulsor rotor is configured to rotate about a rotational axis. The open guide vane structure is axially next to the open propulsor rotor. The open guide vane structure includes a plurality of open guide vanes arranged circumferentially about the rotational axis. The open guide vanes include a first open guide vane. The vane actuation system is radially inboard of the open guide vane structure. The vane actuation system includes a track, a carriage and an actuator. The track extends axially along the rotational axis. The carriage is mated with the track with the first open guide vane connected to the carriage. The actuator is configured to move the carriage along the track such that movement of the carriage along the track translates the first open guide vane axially along the rotational axis, for example, a travel distance that is between one-quarter and five times an axial distance between the open guide vane structure and the open propulsor rotor.

The assembly may also include a blade actuation system. The propulsor rotor may include a plurality of propulsor blades arranged circumferentially about the rotational axis. The propulsor blades may include a first propulsor blade. The blade actuation system may be configured to pivot the first propulsor blade about a first blade pivot axis.

Each of the guide vanes may project radially out into an ambient environment outside of the aircraft propulsion system.

The propulsor rotor may include a plurality of propulsor blades arranged circumferentially about the rotational axis. The propulsor blades may include a first propulsor blade. The first propulsor blade may include a first blade leading edge, a first blade trailing edge and a first blade chord length measured from the first blade leading edge to the first blade trailing edge. A blade reference plane may be axially aligned with the first blade trailing edge and perpendicular to the rotational axis. A vane reference plane may be axially aligned with a leading edge of the first guide vane and perpendicular to the rotational axis. The vane actuation system may be configured to translate the first guide vane to maintain an axial distance between the blade reference plane and the vane reference plane that is between one-quarter of the first blade chord length and five times the first blade chord length.

The open guide vane structure may be configured to condition air propelled by the open propulsor rotor.

The assembly may also include a track, a carriage and an actuator. The track may extend axially along the rotational axis. The carriage may be mated with the track. The first open guide vane may be connected to the carriage. The actuator may be configured to move the carriage along the track. Movement of the carriage along the track may translate the first open guide vane axially along the rotational axis.

The open guide vanes may also include a second open guide vane. The second open guide vane may be connected to the carriage. The movement of the carriage along the track may also translate the second open guide vane axially along the rotational axis.

The open guide vanes may be arranged circumferentially about the rotational axis in an annular array. Each of the open guide vanes may be connected to the carriage. The movement of the carriage along the track may also translate each of the open guide vanes axially along the rotational axis.

The assembly may also include a blade pivot apparatus mounted with the carriage. The blade pivot apparatus may be configured to pivot the first open guide vane about a pivot axis.

The first open guide vane may also be configured to pivot about a first vane pivot axis.

The first vane pivot axis may be coplanar with the rotational axis.

The first vane pivot axis may be non-coplanar with the rotational axis.

The first vane pivot axis may be perpendicular to the rotational axis when viewed in a reference plane parallel with the rotational axis.

The first vane pivot axis may be angularly offset from the rotational axis by an acute angle when viewed in a reference plane parallel with the rotational axis.

The open propulsor rotor may include a plurality of open propulsor blades arranged circumferentially about the rotational axis. The open propulsor blades may include a first open propulsor blade. The first open propulsor blade may be configured to pivot about a first blade pivot axis.

The first open propulsor blade may include a first blade leading edge, a first blade trailing edge and a first blade chord length measured from the first blade leading edge to the first blade trailing edge. The blade reference plane may be axially aligned with the first blade trailing edge and perpendicular to the rotational axis. The vane reference plane may be axially aligned with the first vane leading edge and perpendicular to the rotational axis. The assembly may also include a vane actuation system configured to move the first open guide vane to maintain an axial gap between the blade reference plane and the vane reference plane as the first open propulsor blade pivots about the first blade pivot axis. An axial dimension of the axial gap may change no more than one-quarter of the first blade chord length during the movement of the first open guide vane. The movement of the first open guide vane may include the axial translation of the first open guide vane along the rotational axis.

The open propulsor rotor may include a plurality of open propulsor blades arranged circumferentially about the rotational axis. The open propulsor blades may include a first open propulsor blade. The first open propulsor blade may include a first blade leading edge, a first blade trailing edge and a first blade chord length measured from the first blade leading edge to the first blade trailing edge. A blade reference plane may be axially aligned with the first blade trailing edge and perpendicular to the rotational axis. A vane reference plane may be axially aligned with the first vane leading edge and perpendicular to the rotational axis. The assembly may also include a vane actuation system configured to move the first open guide vane to maintain an axial distance between the blade reference plane and the vane reference plane that is between one-quarter of the first blade chord length and five times the first blade chord length. The movement of the first open guide vane may include the axial translation of the first open guide vane along the rotational axis.

The open propulsor rotor may include a plurality of open propulsor blades arranged circumferentially about the rotational axis. The open propulsor blades may include a first open propulsor blade. The first open propulsor blade may include a first blade leading edge, a first blade trailing edge and a first blade chord length measured from the first blade leading edge to the first blade trailing edge. The first open guide vane may also be configured to pivot about a first vane pivot axis. The assembly may also include a vane actuation system configured to translate the first vane pivot axis no more than two times the first blade chord length during the axial translation of the first open guide vane along the rotational axis.

The assembly may also include a gas generator configured to drive rotation of the open propulsor rotor about the rotational axis. The gas generator may include a flowpath, a compressor section, a combustor section and a turbine section. The flowpath may extend through the compressor section, the combustor section and the turbine section from an inlet into the flowpath to an exhaust from the flowpath. The open propulsor rotor and the open guide vane structure may be disposed outside of the gas generator.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 5A and 5B are plan view illustrations of a propulsor blade and a guide vane in various arrangements.

FIG. 6 schematically illustrates a vane pivot axis coplanar with a propulsion system axis.

FIG. 7 schematically illustrates the vane pivot axis non-coplanar with the propulsion system axis.

FIG. 8 schematically illustrates the vane pivot axis perpendicular to the propulsion system axis.

FIGS. 9A and 9B schematically illustrate the vane pivot axis acutely angled relative to the propulsion system axis.

DETAILED DESCRIPTION

Figure 1:
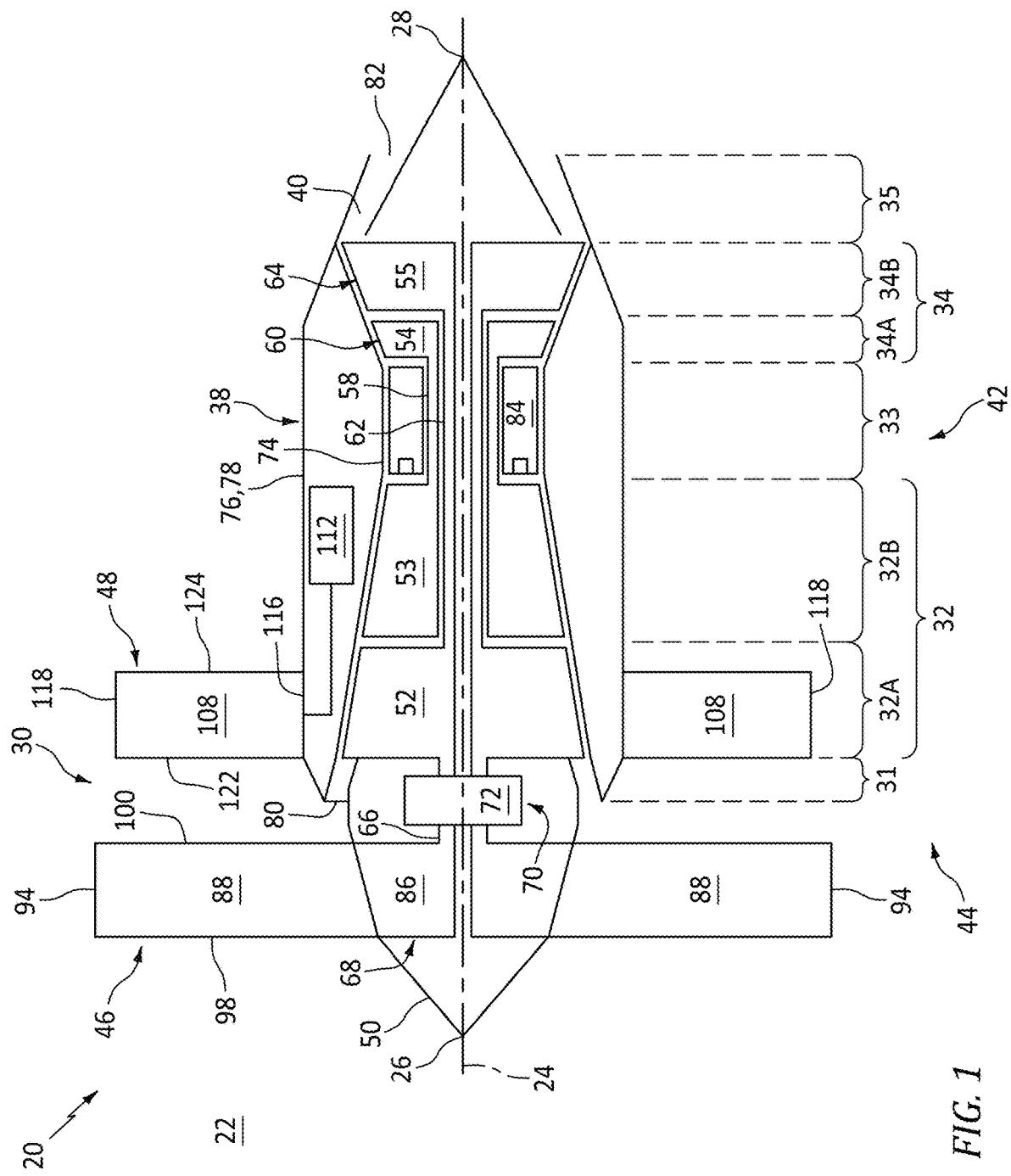
FIG. 1 is a side schematic illustration of an aircraft propulsion system.

FIG. 1 is a side schematic illustration of a propulsion system 20 for an aircraft. The aircraft may be an airplane, a drone (e.g., an unmanned aerial vehicle (UAV)) or any other manned or unmanned aerial vehicle or system. The aircraft propulsion system 20 of FIG. 1 is configured as an open rotor propulsion system with a single rotor and swirl recovery vane (SRV) open rotor architecture. Herein, the term "open" may describe a propulsion system section and/or a propulsion system component which is open to an environment 22 (e.g., an ambient environment) external to the aircraft propulsion system 20 and, more generally, the aircraft. The present disclosure, however, is not limited to such an exemplary aircraft propulsion system configuration as described below in further detail.

The aircraft propulsion system 20 extends axially along an axis 24 between an upstream, forward end 26 of the aircraft propulsion system 20 and a downstream, aft end 28 of the aircraft propulsion system 20. The propulsion system axis 24 may be a centerline axis of the aircraft propulsion system 20 and/or a centerline axis of one or more members of the aircraft propulsion system 20. The propulsion system axis 24 may also or alternatively be a rotational axis of one or more members of the aircraft propulsion system 20.

The aircraft propulsion system 20 of FIG. 1 includes an open propulsion section 30, an inlet section 31, a compressor section 32, a combustor section 33, a turbine section 34, an exhaust section 35, a stationary engine housing 38 and an engine flowpath 40; e.g., an annular core flowpath. The compressor section 32 of FIG. 1 includes a low pressure compressor (LPC) section 32A and a high pressure compressor (HPC) section 32B. The turbine section 34 of FIG. 1 includes a high pressure turbine (HPT) section 34A and a low pressure turbine (LPT) section 34B. At least (or only) the LPC section 32A, the HPC section 32B, the combustor section 33, the HPT section 34A and the LPT section 34B collectively form a core 42 (e.g., a gas generator) of a gas turbine engine 44.

The propulsion section 30 includes a bladed propulsor rotor 46 and a guide vane structure 48. The propulsor rotor 46 of FIG. 1 is configured as an open rotor; e.g., an un-ducted rotor. The propulsor rotor 46, for example, projects radially into and is exposed to the external environment 22. Similarly, the guide vane structure 48 of FIG. 1 is configured as an open guide vane structure; e.g., an unducted guide vane structure. The guide vane structure 48, for example, projects radially into and is exposed to the external environment 22. The propulsion section 30 of FIG. 1 also includes a nose cone 50 disposed at (e.g., on, adjacent or proximate) the propulsion system forward end 26. Briefly, this nose cone 50 may be configured as a spinner which is rotatable with the propulsor rotor 46 about the propulsion system axis 24. Alternatively, the nose cone 50 may be configured as a stationary structure of the propulsion section 30.

The LPC section 32A includes a bladed low pressure compressor (LPC) rotor 52. The HPC section 32B includes a bladed high pressure compressor (HPC) rotor 53. The HPT section 34A includes a bladed high pressure turbine (HPT) rotor 54. The LPT section 34B includes a bladed low pressure turbine (LPT) rotor 55. Each of the engine rotors 52-55 is configured as a ducted rotor internal to the aircraft propulsion system 20 and outside of the external environment 22. Each of the engine rotors 52-55, for example, includes a rotor base (e.g., a disk or a hub) and a plurality of rotor blades (e.g., airfoils, vanes, etc.). The rotor blades are arranged and may be equispaced circumferentially around the respective rotor base in an array. The rotor blades may also be arranged into one or more stages longitudinally along the engine flowpath 40. Each of the rotor blades is connected to the respective rotor base. Each of the rotor blades projects radially (e.g., spanwise) out from the respective rotor base into the engine flowpath 40 and to a distal tip of the respective rotor blade.

The HPC rotor 53 is coupled to and rotatable with the HPT rotor 54. The HPC rotor 53 of FIG. 1, for example, is connected to the HPT rotor 54 by a high speed shaft 58. At least (or only) the HPC rotor 53, the HPT rotor 54 and the high speed shaft 58 collectively form a high speed rotating assembly 60; e.g., a high speed spool of the turbine engine 44 and its engine core 42. This high speed rotating assembly 60 of FIG. 1 and its members 53, 54 and 58 are rotatable about the propulsion system axis 24. However, in other embodiments, the high speed rotating assembly 60 and its members 53, 54 and 58 may alternatively be rotatable about another rotational axis which is (e.g., laterally and/or angularly) offset from an axis of the propulsor rotor 46.

The LPC rotor 52 is coupled to and rotatable with the LPT rotor 55. The LPC rotor 52 of FIG. 1, for example, is connected to the LPT rotor 55 by a low speed shaft 62. At least (or only) the LPC rotor 52, the LPT rotor 55 and the low speed shaft 62 collectively form a low speed rotating assembly 64; e.g., a low speed spool of the turbine engine 44 and its engine core 42. This low speed rotating assembly 64 of FIG. 1 and its members 52, 55 and 62 are rotatable about the propulsion system axis 24. However, in other embodiments, the low speed rotating assembly 64 and its members 52, 55 and 62 may alternatively be rotatable about another rotational axis which is (e.g., laterally and/or angularly) offset from the axis of the propulsor rotor 46.

The propulsor rotor 46 is connected to and rotatable with a propulsor shaft 66. At least (or only) the propulsor rotor 46 and the propulsor shaft 66 collectively form a propulsor rotating assembly 68. This propulsor rotating assembly 68 of FIG. 1 and its members 46 and 66 are rotatable about the propulsion system axis 24. The propulsor rotating assembly 68 of FIG. 1 is coupled to the low speed rotating assembly 64 through a drivetrain 70. This drivetrain 70 may be configured as a geared drivetrain, where a geartrain 72 (e.g., a transmission, a speed change device, an epicyclic geartrain, etc.) is disposed between and operatively couples the propulsor rotating assembly 68 and its propulsor shaft 66 to the low speed rotating assembly 64 and its low speed shaft 62. With this arrangement, the propulsor rotor 46 may rotate at a different (e.g., slower) rotational speed than the low speed rotating assembly 64 and its LPT rotor 55. However, the drivetrain 70 may alternatively be configured as a direct-drive drivetrain, where the geartrain 72 is omitted. With this arrangement, the propulsor rotor 46 and the LPT rotor 55 may rotate at a common (the same) rotational speed.

The engine sections 31-35 may be arranged sequentially along the propulsion system axis 24 and are housed within and/or formed by the engine housing 38. The engine housing 38 of FIG. 1 includes an engine case 74 (e.g., a gas generator case) and a nacelle 76. The engine case 74 houses one or more of the engine sections 32A-34B; e.g., the engine core 42. The engine case 74 of FIG. 1, for example, extends axially along (e.g., axially overlaps) and extends circumferentially about (e.g., circumscribes) the engine sections 32A-34B and their respective bladed rotors 52-55. The engine case 74 may also house the geartrain 72. The nacelle 76 houses and provides an aerodynamic cover over the engine case 74. An exterior wall 78 of the nacelle 76 of FIG. 1, for example, is disposed radially outboard of, extends axially along (e.g., axially overlaps) and extends circumferentially about (e.g., circumscribes) the engine core 42 and its engine case 74. With this arrangement, the engine rotors 52-55 are disposed within the engine housing 38. By contrast, the propulsor rotor 46 and the guide vane structure 48 are disposed at least partially (or completely) outside of the engine housing 38.

During operation of the aircraft propulsion system 20, ambient air within the external environment 22 is propelled by the propulsor rotor 46 in an aft, downstream direction towards the propulsion system aft end 28. A major portion (e.g., more than 50%) of this air bypasses the engine core 42 to provide forward thrust while a minor portion (e.g., less than 50%) of the air flows into the engine core 42. An outer stream of the air propelled by the propulsor rotor 46, for example, flows axially across the guide vane structure 48 and outside of the engine housing 38 (along the nacelle wall 78). The guide vane structure 48 is configured to condition (e.g., turn, straighten out) the air propelled by the propulsor rotor 46, for example, to remove or reduce circumferential swirl and thereby enhance the forward thrust. An inner stream of the air propelled by the propulsor rotor 46 flows through an airflow inlet 80 of the engine flowpath 40 into the aircraft propulsion system 20 and its engine core 42. The engine flowpath 40 extends sequentially through the inlet section 31, the LPC section 32A, the HPC section 32B, the combustor section 33, the HPT section 34A, the LPT section 34B and the exhaust section 35 from the flowpath inlet 80 to a combustion products exhaust 82 from the engine flowpath 40 into the external environment 22. The air entering the engine flowpath 40 may be referred to as "core air".

The core air is compressed by the LPC rotor 52 and the HPC rotor 53 and directed into a combustion chamber 84 (e.g., an annular combustion chamber) of a combustor (e.g., an annular combustor) in the combustor section 33. Fuel is injected into the combustion chamber 84 and mixed with the compressed core air to provide a fuel-air mixture. This fuel-air mixture is ignited and combustion products thereof flow through and sequentially drive rotation of the HPT rotor 54 and the LPT rotor 55. The rotation of the HPT rotor 54 and the LPT rotor 55 respectively drive rotation of the HPC rotor 53 and the LPC rotor 52 and, thus, compression of the air received from the flowpath inlet 80. The rotation of the LPT rotor 55 also drives rotation of the propulsor rotor 46 through the geartrain 72. The rotation of the propulsor rotor 46, in turn, propels the ambient air within the external environment 22 in the aft, downstream direction. With this arrangement, the engine core 42 powers operation of (e.g., drives rotation of) the propulsor rotor 46 during aircraft propulsion system operation.

Figure 2:
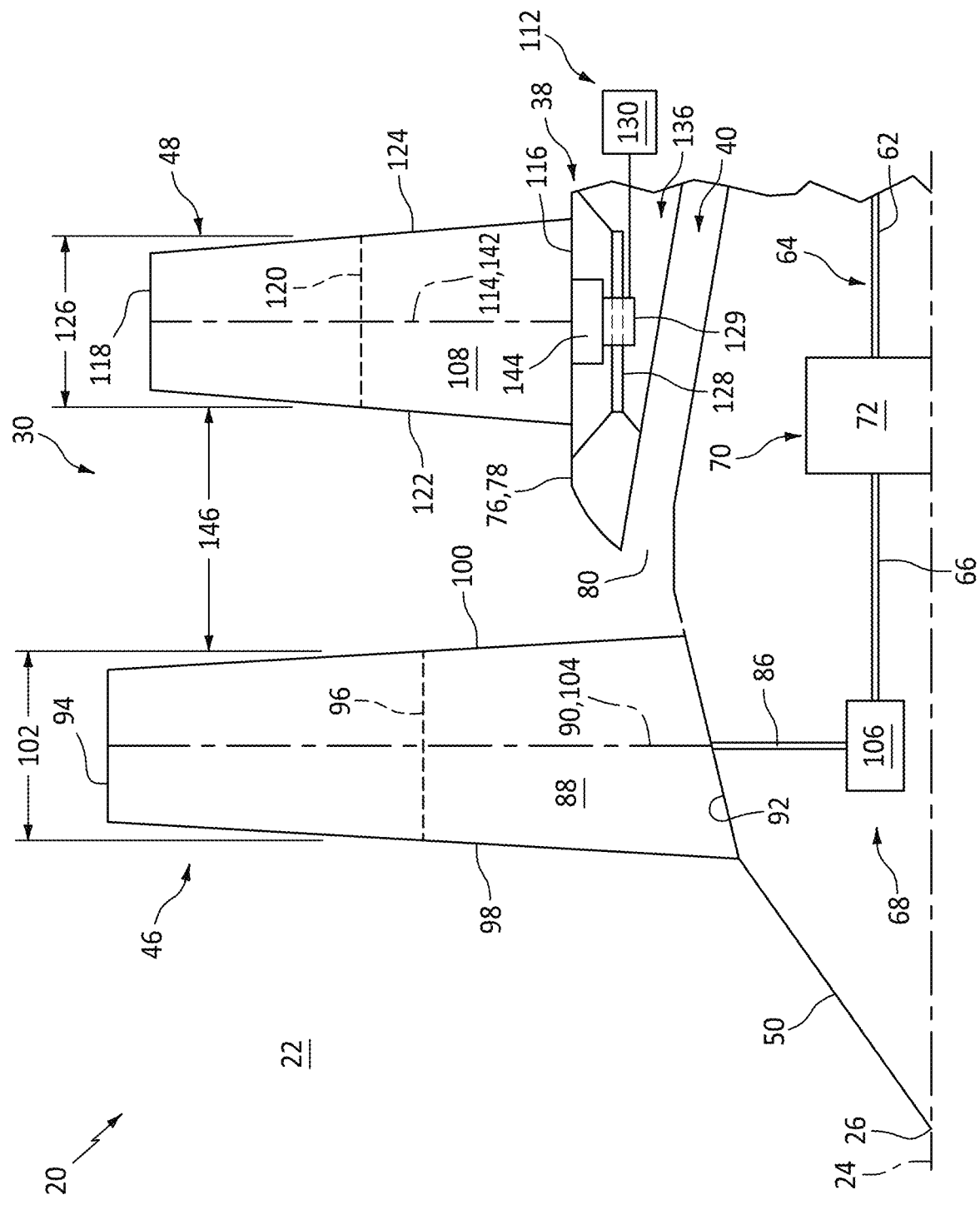
FIG. 2 is a partial schematic illustration of the aircraft propulsion system at a propulsion section.

Referring to FIG. 2, the propulsor rotor 46 includes a rotor base 86 (e.g., a disk or a hub) and a plurality of open propulsor blades 88 (e.g., airfoils). The propulsor blades 88 are arranged and may be equispaced circumferentially about the rotor base 86 and the propulsion system axis 24 in an array; e.g., a circular array. Each of the propulsor blades 88 is connected to (e.g., formed integral with or otherwise attached to) the rotor base 86. Each of the propulsor blades 88 projects spanwise along a center span line 90 of the respective propulsor blade 88 (e.g., radially relative to the propulsion system axis 24) out from an exterior surface 92 of the rotor base 86, into the external environment 22, to an unshrouded distal tip 94 of the respective propulsor blade 88. Each propulsor blade 88 is thereby configured as an un-ducted and unshrouded propulsor blade which is exposed to (e.g., disposed in) the surrounding external environment 22.

Each propulsor blade 88 extends longitudinally along a mean line 96 (e.g., a camber line) of the respective propulsor blade 88 within the external environment 22 from a leading edge 98 of the respective propulsor blade 88 to a trailing edge 100 of the respective propulsor blade 88. Each propulsor blade 88 has a chord length 102 (e.g., a fixed, non-varying chord length) measured as a straight-line distance from the blade leading edge 98 to the blade trailing edge 100 of the respective propulsor blade 88. In FIG. 2, the blade chord length 102 is measured at a mid-span of the respective propulsor blade 88. More particularly, the blade chord length 102 of FIG. 2 is measured at a location along the blade span line 90 half-way/fifty percent (50%) of a span between the exterior surface 92 of the rotor base 86 and the blade tip 94.

Each propulsor blade 88 may be configured to pivot about a pivot axis 104 of the respective propulsor blade 88. The blade pivot axis 104 extends radially relative to the propulsion system axis 24. The blade pivot axis 104 of FIG. 2, for example, is arranged perpendicular to the propulsion system axis 24 when viewed, for example, in a longitudinal reference plane parallel to (e.g., including) the propulsion system axis 24; e.g., the plane of FIG. 2. This blade pivot axis 104 may or may not be coaxial with or otherwise parallel with the blade span line 90. Each propulsor blade 88 of FIG. 2 is operatively coupled with a blade actuation system 106. This blade actuation system 106 is configured to pivot each propulsor blade 88 about its own blade pivot axis 104. By pivoting each propulsor blade 88 about its blade pivot axis 104, a pitch of the respective propulsor blade 88 may be changed. Of course, it is contemplated some or all of the propulsor blades 88 may be alternatively moved to change the propulsor blade pitch. Moreover, it is contemplated some or all of the propulsor blades 88 may alternatively be fixed pitch propulsor blades in other embodiments.

The guide vane structure 48 of FIG. 2 includes a plurality of open exit guide vanes 108 (e.g., variable position airfoils). The guide vanes 108 are arranged and may (or may not) be equispaced circumferentially about the propulsion system axis 24 in an array; e.g., a circular array. This guide vane structure 48 and its guide vanes 108 are arranged axially next to (e.g., adjacent) the propulsor rotor 46 and its propulsor blades 88. The guide vane structure 48 and its guide vanes 108 of FIG. 2, for example, are arranged downstream of the propulsor rotor 46 and its propulsor blades 88, without (e.g., any) other elements axially therebetween to obstruct, turn and/or otherwise influence the air propelled by the propulsor rotor 46 to the guide vane structure 48 for example. Each of the guide vanes 108 may be mounted to an internal support structure 110 (see FIGS. 3A and 3B) of the engine housing 38 through a vane actuation system 112. This support structure 110 may be a support frame, a case or another fixed structure of the engine housing 38.

Each of the guide vanes 108 projects spanwise along a center span line 114 of the respective guide vane 108 (e.g., radially relative to the propulsion system axis 24) out from an exterior surface 116 of the engine housing 38, into the external environment 22, to an unshrouded, distal tip 118 of the respective guide vane 108. Each guide vane 108 is thereby configured as an un-ducted and unshrouded guide vane which is exposed to (e.g., disposed in) the surrounding external environment 22.

Each guide vane 108 extends longitudinally along a mean line 120 (e.g., a camber line) of the respective guide vane 108 within the external environment 22 from a leading edge 122 of the respective guide vane 108 to a trailing edge 124 of the respective guide vane 108. Each guide vane 108 has a chord length 126 (e.g., a fixed, non-varying chord length) measured as a straight-line distance from the vane leading edge 122 to the vane trailing edge 124 of the respective guide vane 108. In FIG. 2, the vane chord length 126 is measured at a mid-span of the respective guide vane 108. More particularly, the vane chord length 126 of FIG. 2 is measured at a location along the vane span line 114 half-way/fifty percent (50%) of a span between the exterior surface 116 of the engine housing 38 and the vane tip 118.

Figure 3B:
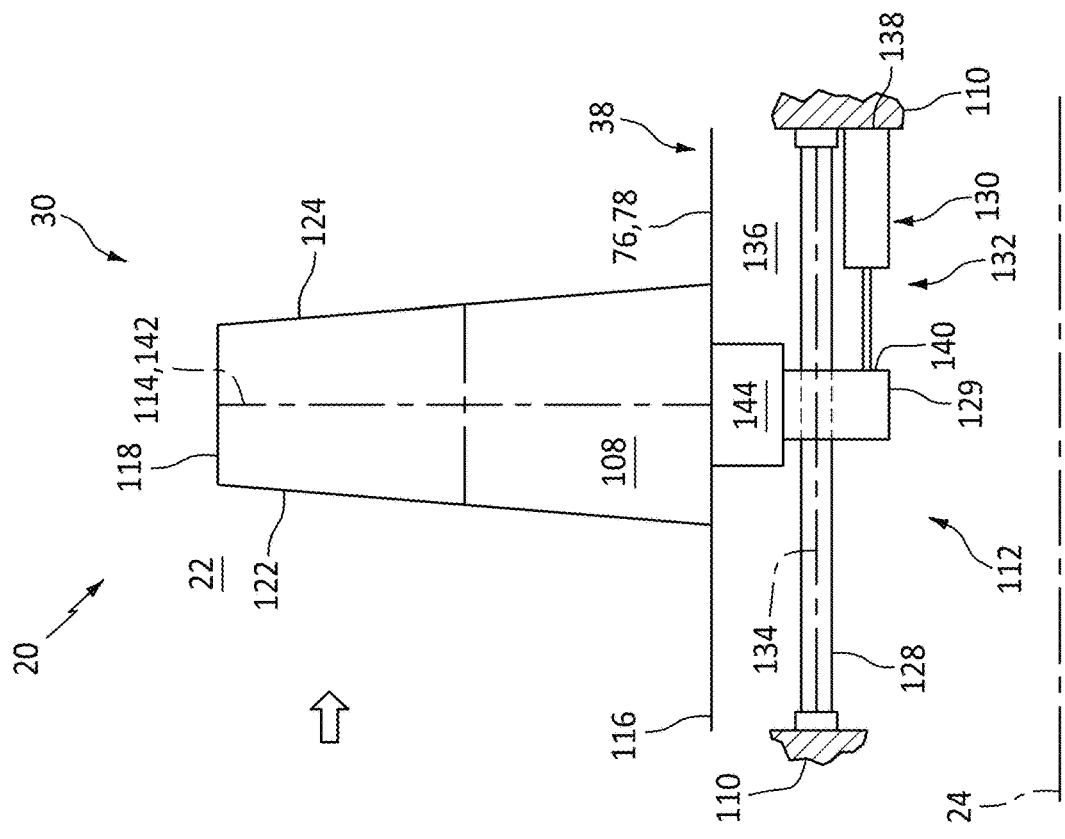
FIGS. 3A and 3B are schematic illustrations of a portion of the propulsion section with a guide vane at various axial positions.
Figure 3A:
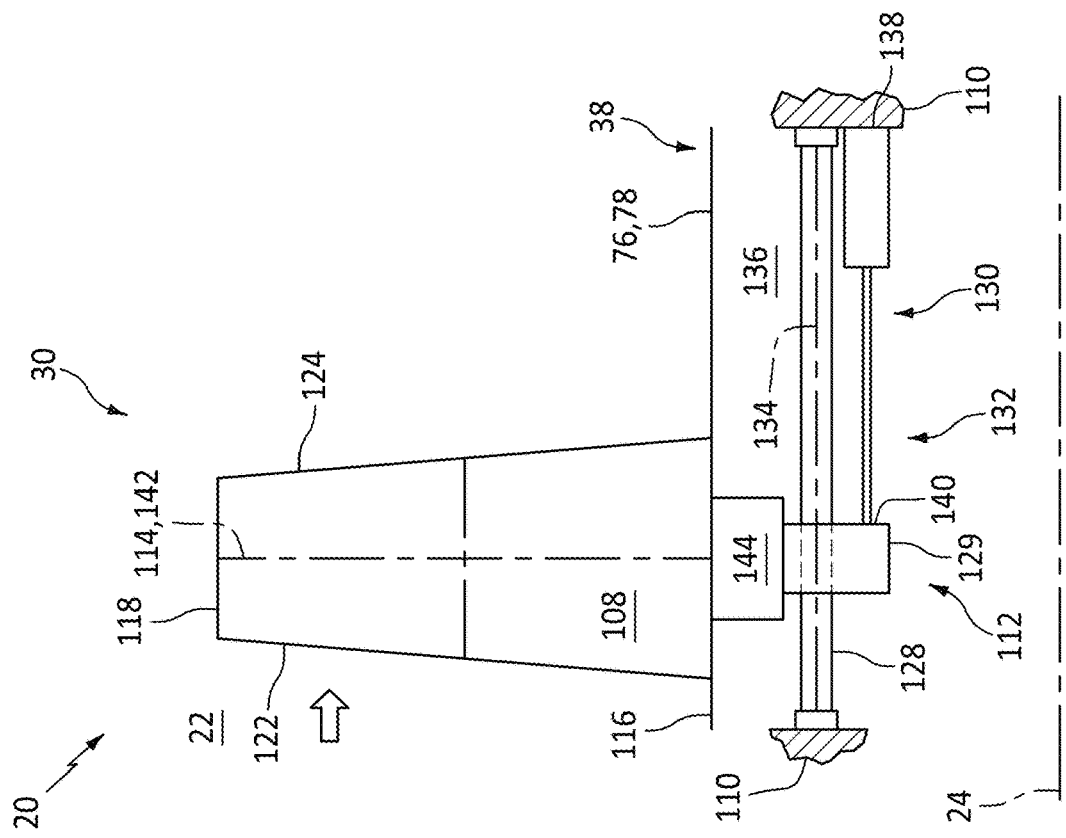

Referring to FIGS. 3A and 3B, the vane actuation system 112 is configured to translate each guide vane 108 axially along the propulsion system axis 24 between an axial forward position (e.g., see FIG. 3A) and an axial aft position (e.g., see FIG. 3B). The vane actuation system 112 may also be configured to axially translate each guide vane 108 to a set number, or an infinite number, of intermediate position(s) axially along the propulsion system axis 24 between the forward position of FIG. 3A and the aft position of FIG. 3B. The vane actuation system 112 of FIGS. 3A, 3B and 4, for example, includes one or more tracks 128, a carriage 129 and one or more actuators 130, where these components 128-130 collectively form a vane translation apparatus 132 for the guide vanes 108.

Figure 4:
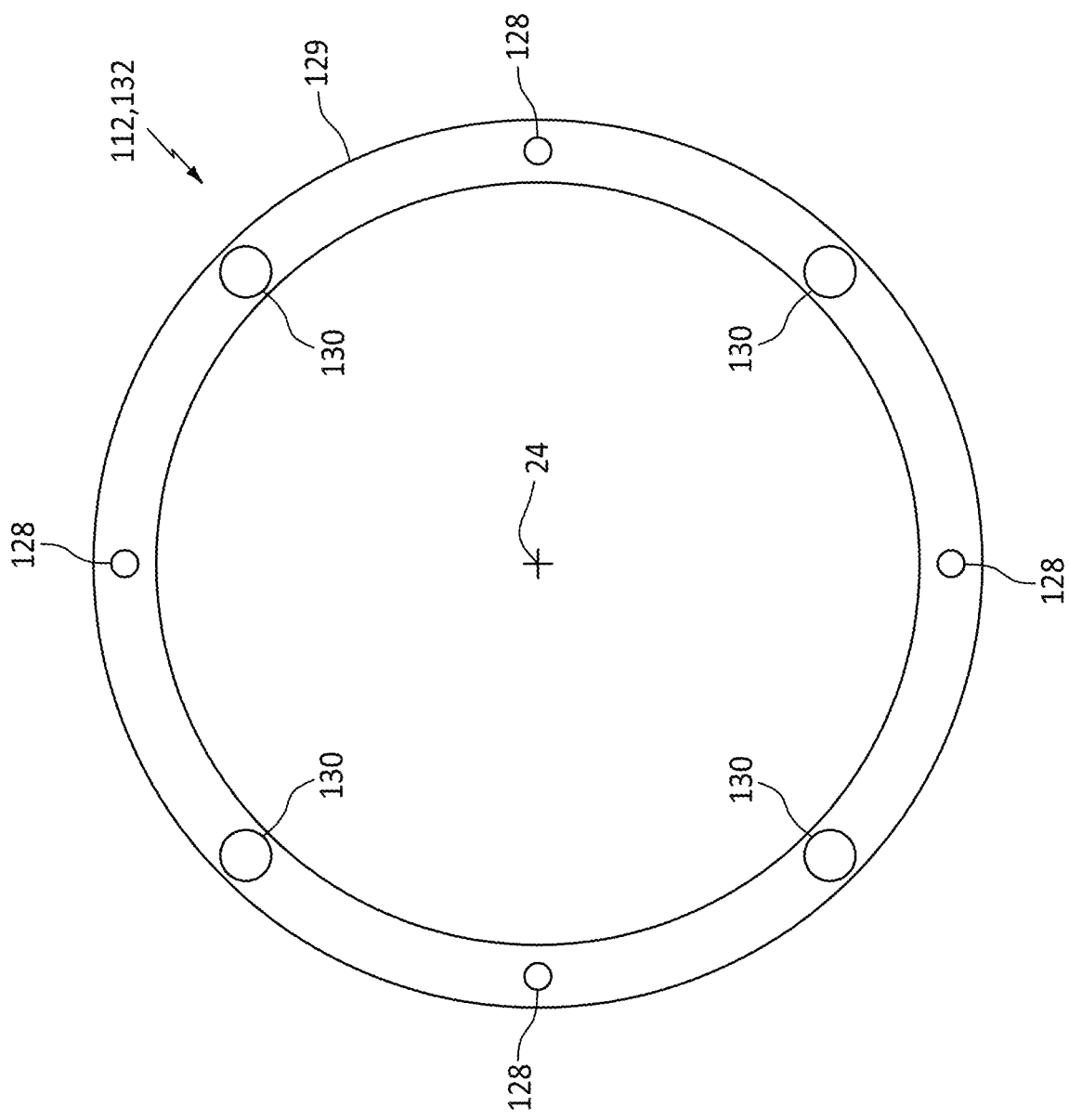
FIG. 4 is an end view illustration of a vane translation apparatus.

Referring to FIG. 4, the tracks 128 are arranged and may be equispaced circumferentially about the propulsion system axis 24 in an array; e.g., a circular array, an arcuate array, or otherwise. Referring to FIGS. 3A and 3B, each track 128 extends longitudinally along a centerline 134 of the respective track 128. This track centerline 134 may be (e.g., completely) parallel to the propulsion system axis 24. Alternatively, it is contemplated the track centerline 134 may be slightly skewed from the propulsion system axis 24 in a tangential direction to a reference circle circumscribing the propulsion system axis 24. Each track 128 may be mounted (e.g., fixedly attached) to the support structure 110 within an interior compartment 136 of the engine housing 38.

The carriage 129 may be arranged within the interior compartment 136 of the engine housing 38. The carriage 129 is mated with each track 128. More particularly, the carriage 129 is engaged with each track 128 such that the carriage 129 is operable to slide, roll and/or otherwise move along each track 128 in guided axial movement.

Referring to FIG. 4, the actuators 130 are arranged and may be equispaced circumferentially about the propulsion system axis 24 in an array; e.g., a circular array, an arcuate array, or otherwise. Referring to FIGS. 3A and 3B, each actuator 130 may be arranged within the interior compartment 136 of the engine housing 38. A base end mount 138 of each actuator 130 may be attached to the support structure 110. A distal end mount 140 of each actuator 130 may be attached to the carriage 129. Examples of the actuators 130 include, but are not limited to, linear actuators (e.g., hydraulic pistons), leadscrew actuators or the like. The actuators 130 are configured to move the carriage 129 along the tracks 128, where each of the guide vanes 108 is (e.g., directly or indirectly) mounted to the carriage 129. Therefore, by moving the carriage 129 along the tracks 128, the vane translation apparatus 132 and its actuators 130 may axially translate the guide vanes 108 between their forward position of FIG. 3A and their aft position of FIG. 3B.

The vane actuation system 112 of FIGS. 3A and 3B may also be configured to pivot each guide vane 108 about a pivot axis 142 of the respective guide vane 108. The vane actuation system 112 of FIGS. 3A and 3B, for example, also includes a vane pivot apparatus 144 within the interior compartment 136 of the engine housing 38. This vane pivot apparatus 144 is mounted to or otherwise arranged with the carriage 129. The vane pivot apparatus 144 is configured to pivot each guide vane 108 about its own vane pivot axis 142. By pivoting each guide vane 108 about its vane pivot axis 142, a pitch of the respective guide vane 108 may be changed. The vane pivot axis 142 extends radially relative to the propulsion system axis 24. The vane pivot axis 142 of FIGS. 3A and 3B, for example, is arranged perpendicular to the propulsion system axis 24 when viewed, for example, in the longitudinal reference plane. This vane pivot axis 142 may or may not be coaxial with or otherwise parallel with the vane span line 114. Of course, it is contemplated some or all of the guide vanes 108 may be alternatively moved to change the guide vane pitch. Moreover, it is contemplated one, some or all of the guide vanes 108 may alternatively be fixed pitch guide vanes in other embodiments.

The vane actuation system 112 and its vane pivot apparatus 144 may change (e.g., decrease or increase) the guide vane pitch based on various operational parameters including, but not limited to, flow characteristics of the air propelled by the propulsor rotor 46 and/or the propulsor blade pitch. For example referring to FIG. 5A, where the propulsor rotor 46 imparts a relatively small degree of swirl onto the air being propelled towards the guide vane structure 48 (e.g., where the propulsor blade pitch is relatively large), each guide vane 108 may be arranged with a relatively large guide vane pitch; e.g., a relatively coarse guide vane pitch. Now referring to FIG. 5B, where the propulsor rotor 46 imparts a relatively large degree of swirl onto the air being propelled towards the guide vane structure 48 (e.g., where the propulsor blade pitch is relatively small), each guide vane 108 may be arranged with a relatively small guide vane pitch; e.g., a relatively fine guide vane pitch. With such operation, the guide vane structure 48 may condition (e.g., straighten out) the outer stream of air propelled by the propulsor rotor 46 to enhance (e.g., remove or reduce circumferential swirl) and boost the forward thrust.

Referring to FIGS. 3A and 3B, the vane actuation system 112 and its vane translation apparatus 132 may change the axial guide vane position to provide a certain balance between, for example, propulsion system thrust recovery and propulsion system acoustic performance. For example, to improve thrust recovery, the vane actuation system 112 and its vane translation apparatus 132 may axially translate the guide vanes 108 forward to decrease a distance 146 of an air gap (see FIGS. 5A and 5B) between the propulsor rotor 46 and the guide vane structure 48. Referring to FIGS. 5A and 5B, the inter blade-vane distance 146 is measured as a straight-line axial distance from a blade reference plane 148 to a vane reference plane 150. The blade reference plane 148 is a reference plane that is axially aligned with (e.g., on) the blade trailing edge(s) 100 and perpendicular to the propulsion system axis 24. The vane reference plane 150 is a reference plane that is axially aligned with (e.g., on) the vane leading edge(s) 122 and perpendicular to the propulsion system axis 24. By contrast, to improve acoustic performance, the vane actuation system 112 and its vane translation apparatus 132 (see FIGS. 3A and 3B) may axially translate the guide vanes 108 aft to increase the inter blade-vane distance 146 between the propulsor rotor 46 and the guide vane structure 48. More particularly, the inter blade-vane distance 146 may be increased to reduce effects of tip vortices generated by the open propulsor blades 88 on the downstream open guide vanes 108.

The balance between the propulsion system thrust recovery and the propulsion system acoustic performance may change throughout an aircraft flight. For example, when the aircraft is close to ground, increased acoustic performance may be weighed higher in the balance, for example, to meet acoustic noise regulations. In another example, when the aircraft is at cruise high above the ground, increased thrust recovery may be weighed higher in the balance, for example, to increase aircraft propulsion system fuel efficiency. Of course, it is contemplated the inter blade-vane distance 146 may also or alternatively be adjusted based on various other operational parameters. Moreover, while FIGS. 5A and 5B illustrate adjusting both the guide vane pitch and the axial guide vane position, it is contemplated the vane actuation system 112 (see FIGS. 3A and 3B) may alternatively (a) adjust the guide vane pitch while keeping the axial guide vane position fixed and/or (b) adjust the axial guide vane position while keeping the guide vane pitch fixed.

In some embodiments, referring to FIGS. 3A, 3B, 5A and 5B, the vane actuation system 112 may be operated to maintain the inter blade-vane distance 146 greater than one-quarter (¼) of the blade chord length 102 (e.g., at the mid span) and/or less than five times (5×) the blade chord length 102 (e.g., at the mid span). For example, the inter blade-vane distance 146 may be maintained between one-quarter (¼) of the blade chord length 102 and one time (1×) the blade chord length 102, between one time (1×) the blade chord length 102 and three times (3×) the blade chord length 102, or between three times (3×) the blade chord length 102 and five times (5×) the blade chord length 102. The foregoing inter blade-vane distance 146 may be particularly useful where the propulsor blade pitch is relatively large as shown, for example, in FIG. 5A.

In some embodiments, the vane actuation system 112 may be operated to maintain the inter blade-vane distance 146 substantially or completely uniform; e.g., constant. For example, as the blade actuation system 106 pivots the propulsor blades 88, the vane actuation system 112 may move (e.g., pivot and/or translate) the guide vanes 108 such that the inter blade-vane distance 146 does not change more than one-quarter (¼) of the blade chord length 102 (e.g., at the mid span). More particularly, when each propulsor blade 88 has a propulsor blade pitch as shown in FIG. 5A, each guide vane 108 may be positioned such that the inter blade-vane distance 146 has a first value (X). When each propulsor blade 88 has a propulsor blade pitch as shown in FIG. 5B, each guide vane 108 may be positioned such that the inter blade-vane distance 146 has a second value (Y). Here, an absolute value of the first value (X) minus the second value (Y) is equal to or less than one-quarter (¼) of the blade chord length 102 (Z): |X−Y|≤Z.

In some embodiments, still referring to FIGS. 3A, 3B, 5A and 5B, the vane actuation system 112 and its vane translation apparatus 132 may be operated to translate each guide vane 108 no more than one time (1×) or two times (2×) the blade chord length 102 (e.g., at the mid span). In other words, each guide vane 108 may be configured with a maximum axial travel distance of no more than one time (1×) or two times (2×) the blade chord length 102 (e.g., at the mid span). This maximum axial travel distance may be measured relative to the vane pivot axis 142 where the respective guide vane 108 is pivotable. Where the respective guide vane 108 is non-pivotable, the maximum axial travel distance may be measured relative to the vane leading edge 122, the vane trailing edge 124, or another vane reference.

In some embodiments, referring to FIG. 6, the vane pivot axis 142 may be coplanar with the propulsion system axis 24. The vane pivot axis 142 of FIG. 6, for example, is coincident with the propulsion system axis 24. In other embodiments, referring to FIG. 7, the vane pivot axis 142 may be non-coplanar with the propulsion system axis 24. The vane pivot axis 142 of FIG. 7, for example, is non-coincident with the propulsion system axis 24.

In some embodiments, referring to FIG. 8, the vane pivot axis 142 may be perpendicular to the propulsion system axis 24 when viewed in the longitudinal reference plane parallel with the propulsion system axis 24. In other embodiments, referring to FIGS. 9A and 9B, the vane pivot axis 142 may be angularly offset from the propulsion system axis 24 by an included angle (e.g., a non-zero acute angle) when viewed in the longitudinal reference plane. In FIG. 9A, the vane pivot axis 142 is tilted in a forward, upstream direction. In FIG. 9B, the vane pivot axis 142 is tilted in an aft, downstream direction. Whether the vane pivot axis 142 is arranged as shown in FIG. 8 or FIG. 9A, 9B, the vane pivot axis 142 may be coplanar as shown in FIG. 6 or non-coplanar as shown in FIG. 7.

In some embodiments, referring to FIG. 4, the vane actuation system 112 may include a single vane translation apparatus 132 and, thus, a single carriage 129 for all of the translatable guide vanes 108 (see FIG. 2). In other embodiments, the vane actuation system 112 may include multiple of the vane translation apparatuses, where each of these vane translation apparatuses includes its own independently translatable carriage. Each carriage may be associated with and support a subset of the translatable guide vanes 108, or each carriage may be associated with and support a respective single one of the translatable guide vanes 108. In such embodiments, it is contemplated one, some or all of the carriages may (or may not) each move (e.g., slightly) radially as that respective carriage moves axially, or axially and (e.g., slightly) circumferentially between the positions of FIGS. 3A and 3B.

The engine flowpath 40 of FIG. 1 is configured such that the core air and the combustion products generally flow in the aft, downstream direction towards the propulsion system aft end 28. The core air and the combustion products thereby flow along with the ambient air propelled by the rotating propulsor rotor 46 in a common axial direction—the downstream, aft direction. The turbine engine 44 of the present disclosure, however, is not limited to such an exemplary common flow engine arrangement. For example, the engine flowpath 40 may alternatively be configured such that the core air and the combustion products generally flow in a forward, upstream direction towards the propulsion system forward end 26. The core air and the combustion products may thereby flow in an opposite direction as the ambient air propelled by the rotating propulsor rotor 46. Here, the turbine engine 44 may have a reverse flow engine arrangement.

The propulsion section 30 of FIG. 1 is described above with a tractor configuration; e.g., where the propulsor rotor 46 is disposed at or otherwise near the propulsion system forward end 26. It is contemplated, however, the propulsion section 30 may alternatively be disposed at or otherwise near the propulsion system aft end 28 to provide a pusher fan configuration. It is also contemplated the propulsion section 30 and its guide vane structure 48 may alternatively be used with other types of propulsion systems such as, for example, a turbofan or other ducted propulsion system. Moreover, while the guide vane structure 48 is described above as being located downstream of the propulsor rotor 46, it is contemplated the guide vane structure 48 may alternatively be configured as an inlet guide vane structure located axially next to and upstream of the propulsor rotor 46.

The guide vane structure 48 is described above as a fixed (e.g., non-rotatable) guide vane structure. It is contemplated, however, the guide vane structure 48 may alternatively be selectively rotatable about the propulsion system axis 24. With such an arrangement, the aircraft propulsion system 20 may be configured as an open rotor propulsion system with a swirl recovery blade (SRB) open rotor architecture. More particularly, the aircraft propulsion system 20 may operate as: (A) a counter-rotating open rotor (CROR) propulsion system during a dual rotor mode of operation (e.g., when both the propulsor rotor 46 and the structure 48 are counter-rotating); and (B) a single open rotor and swirl recovery vane (SRV) propulsion system during a single rotor mode of operation (e.g., when the propulsor rotor 46 is rotating and the structure 48 is rotationally fixed).

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
    an open propulsor rotor configured to rotate about a rotational axis; and
    an open guide vane structure axially next to the open propulsor rotor, the open guide vane structure including a plurality of open guide vanes arranged circumferentially about the rotational axis, and the plurality of open guide vanes comprising a first open guide vane;
    the first open guide vane comprising a first vane leading edge, a first vane trailing edge and a fixed first vane chord length measured from the first vane leading edge to the first vane trailing edge, and the first open guide vane configured to translate axially along the rotational axis.

2. The assembly of claim 1, wherein the open guide vane structure is configured to condition air propelled by the open propulsor rotor.

3. The assembly of claim 1, further comprising:
a track extending axially along the rotational axis;
a carriage mated with the track, wherein the first open guide vane is connected to the carriage; and
an actuator configured to move the carriage along the track, wherein movement of the carriage along the track translates the first open guide vane axially along the rotational axis.

4. The assembly of claim 3, wherein
the plurality of open guide vanes further comprise a second open guide vane;
the second open guide vane is connected to the carriage; and
the movement of the carriage along the track further translates the second open guide vane axially along the rotational axis.

5. The assembly of claim 3, wherein
the plurality of open guide vanes are arranged circumferentially about the rotational axis in an annular array;
each of the plurality of open guide vanes is connected to the carriage; and
the movement of the carriage along the track further translates each of the plurality of open guide vanes axially along the rotational axis.

6. The assembly of claim 3, further comprising:
a blade pivot apparatus mounted with the carriage;
the blade pivot apparatus configured to pivot the first open guide vane about a pivot axis.

7. The assembly of claim 1, wherein the first open guide vane is further configured to pivot about a first vane pivot axis.

8. The assembly of claim 7, wherein the first vane pivot axis is coplanar with the rotational axis.

9. The assembly of claim 7, wherein the first vane pivot axis is non-coplanar with the rotational axis.

10. The assembly of claim 7, wherein the first vane pivot axis is perpendicular to the rotational axis when viewed in a reference plane parallel with the rotational axis.

11. The assembly of claim 7, wherein the first vane pivot axis is angularly offset from the rotational axis by an acute angle when viewed in a reference plane parallel with the rotational axis.

12. The assembly of claim 1, wherein
the open propulsor rotor includes a plurality of open propulsor blades arranged circumferentially about the rotational axis;
the plurality of open propulsor blades comprise a first open propulsor blade; and
the first open propulsor blade is configured to pivot about a first blade pivot axis.

13. The assembly of claim 12, wherein
the first open propulsor blade comprises a first blade leading edge, a first blade trailing edge and a first blade chord length measured from the first blade leading edge to the first blade trailing edge;
a blade reference plane is axially aligned with the first blade trailing edge and perpendicular to the rotational axis;
a vane reference plane is axially aligned with the first vane leading edge and perpendicular to the rotational axis; and
the assembly further comprises a vane actuation system configured to move the first open guide vane to maintain an axial gap between the blade reference plane and the vane reference plane as the first open propulsor blade pivots about the first blade pivot axis, an axial dimension of the axial gap changes no more than one-quarter of the first blade chord length during the movement of the first open guide vane, and the movement of the first open guide vane comprises the axial translation of the first open guide vane along the rotational axis.

14. The assembly of claim 1, wherein
the open propulsor rotor includes a plurality of open propulsor blades arranged circumferentially about the rotational axis, the plurality of open propulsor blades comprise a first open propulsor blade, the first open propulsor blade comprises a first blade leading edge, a first blade trailing edge and a first blade chord length measured from the first blade leading edge to the first blade trailing edge, and a blade reference plane is axially aligned with the first blade trailing edge and perpendicular to the rotational axis;
a vane reference plane is axially aligned with the first vane leading edge and perpendicular to the rotational axis; and
the assembly further comprises a vane actuation system configured to move the first open guide vane to maintain an axial distance between the blade reference plane and the vane reference plane that is between one-quarter of the first blade chord length and five times the first blade chord length, and the movement of the first open guide vane comprises the axial translation of the first open guide vane along the rotational axis.

15. The assembly of claim 1, wherein
the open propulsor rotor includes a plurality of open propulsor blades arranged circumferentially about the rotational axis, the plurality of open propulsor blades comprise a first open propulsor blade, and the first open propulsor blade comprises a first blade leading edge, a first blade trailing edge and a first blade chord length measured from the first blade leading edge to the first blade trailing edge;
the first open guide vane is further configured to pivot about a first vane pivot axis; and
the assembly further comprises a vane actuation system configured to translate the first vane pivot axis no more than two times the first blade chord length during the axial translation of the first open guide vane along the rotational axis.

16. The assembly of claim 1, further comprising:
a gas generator configured to drive rotation of the open propulsor rotor about the rotational axis;
the gas generator including a flowpath, a compressor section, a combustor section and a turbine section;
the flowpath extending through the compressor section, the combustor section and the turbine section from an inlet into the flowpath to an exhaust from the flowpath; and
the open propulsor rotor and the open guide vane structure are disposed outside of the gas generator.

17. An assembly for an aircraft propulsion system, comprising:
a propulsor rotor configured to rotate about a rotational axis;
a guide vane structure axially next to the propulsor rotor, the guide vane structure including a plurality of guide vanes arranged circumferentially about the rotational axis, the plurality of guide vanes comprising a first guide vane; and
a vane actuation system configured to pivot the first guide vane about a first vane pivot axis, and the vane actuation system configured to translate the first vane pivot axis axially along the rotational axis.

18. The assembly of claim 17, further comprising:
a blade actuation system;
the propulsor rotor including a plurality of propulsor blades arranged circumferentially about the rotational axis, and the plurality of propulsor blades comprising a first propulsor blade; and
the blade actuation system configured to pivot the first propulsor blade about a first blade pivot axis.

19. The assembly of claim 17, wherein
the propulsor rotor includes a plurality of propulsor blades arranged circumferentially about the rotational axis, the plurality of propulsor blades comprise a first propulsor blade, the first propulsor blade comprises a first blade leading edge, a first blade trailing edge and a first blade chord length measured from the first blade leading edge to the first blade trailing edge, and a blade reference plane is axially aligned with the first blade trailing edge and perpendicular to the rotational axis;
a vane reference plane is axially aligned with a leading edge of the first guide vane and perpendicular to the rotational axis; and
the vane actuation system is configured to translate the first guide vane to maintain an axial distance between the blade reference plane and the vane reference plane that is between one-quarter of the first blade chord length and five times the first blade chord length.

20. An assembly for an aircraft propulsion system, comprising:
an open propulsor rotor configured to rotate about a rotational axis;
an open guide vane structure axially next to the open propulsor rotor, the open guide vane structure including a plurality of open guide vanes arranged circumferentially about the rotational axis, and the plurality of open guide vanes comprising a first open guide vane; and
a vane actuation system radially inboard of the open guide vane structure, the vane actuation system including a track, a carriage and an actuator, the track extending axially along the rotational axis, the carriage mated with the track with the first open guide vane connected to the carriage, and the actuator configured to move the carriage along the track such that movement of the carriage along the track translates the first open guide vane axially along the rotational axis a travel distance that is between one-quarter and five times an axial distance between the open guide vane structure and the open propulsor rotor.

* * * * *